July 18, 1939.  A. B. CROZIER  2,166,395
POST HOLE DIGGER
Filed Sept. 20, 1938
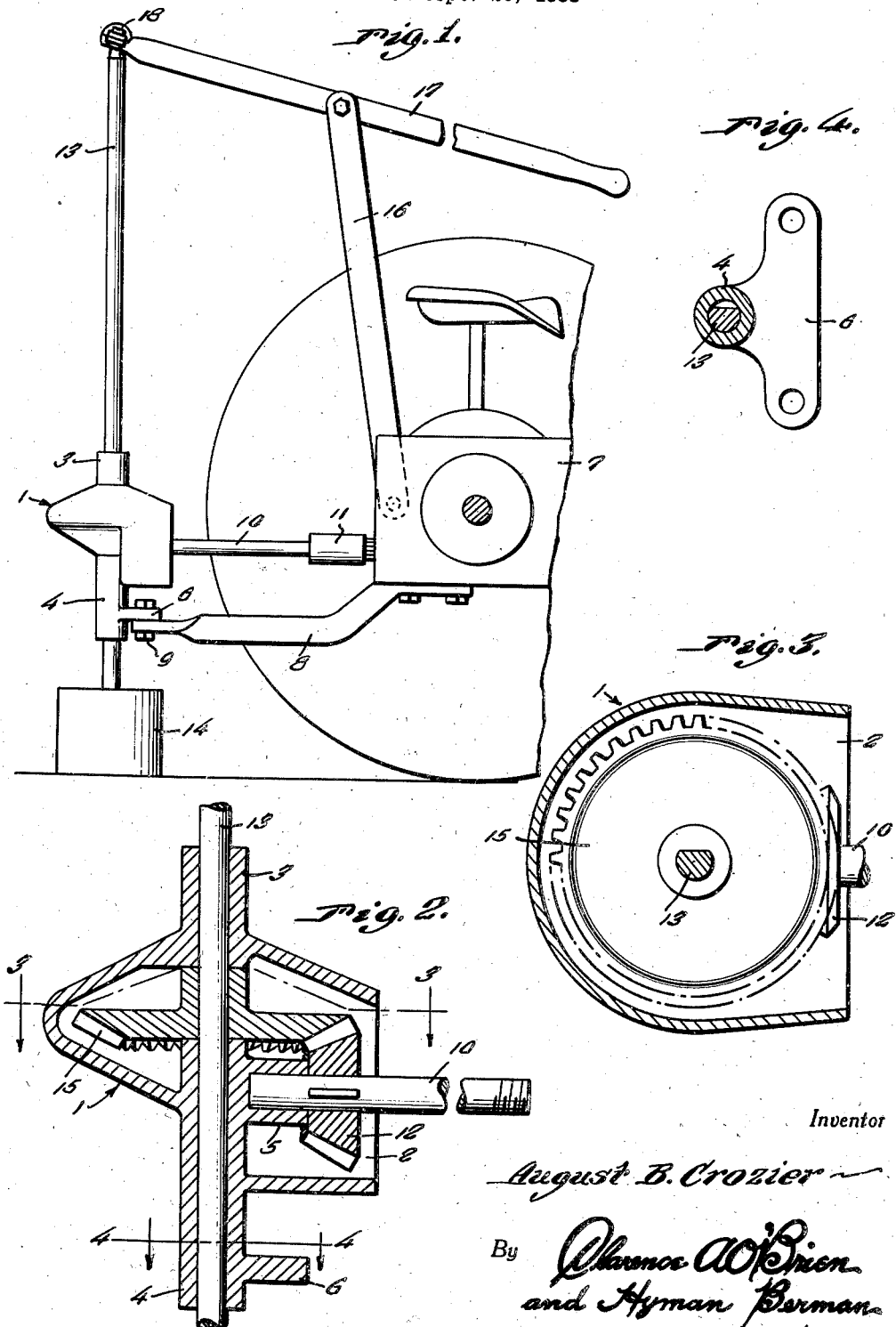
Inventor
August B. Crozier
By Clarence A. O'Brien
and Hyman Berman
Attorneys Patented July 18, 1939

2,166,395

UNITED STATES PATENT OFFICE 2,166,395

POST HOLE DIGGER

August B. Crozier, Walford, Iowa

Application September 20, 1938, Serial No. 230,878

1 Claim. (Cl. 255—19)

The present invention relates to new and useful improvements in post hole diggers and has for its primary object to provide, in a manner as hereinafter set forth, a device of this character embodying a novel construction, combination and arrangement of parts through the medium of which the auger constituting a part thereof may be driven from the usual power take-off of a tractor.

Another very important object of the invention is to provide a post hole digger of the aforementioned character embodying novel means for manually controlling the vertical movement of the auger.

Other objects of the invention are to provide a post hole digger of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of an embodiment of the invention, showing the device mounted for operation on the rear end of a tractor.

Figure 2 is a view in vertical section through the drive mechanism.

Figure 3 is a view in horizontal section, taken substantially on the line 3—3 of Fig. 2.

Figure 4 is a horizontal sectional view, taken substantially on the line 4—4 of Fig. 2.

Referring now to the drawing in detail, it will be seen that the embodiment of the invention which has been illustrated comprises a housing of suitable metal which is designated generally by the reference numeral 1, said housing being open at its front, as at 2. Formed integrally with the housing 1 are vertically alined bearings 3 and 4. Projecting forwardly from the upper portion of the bearing 4 in the housing 1 is a bearing 5. The bearing 4, it will be noted, extends below the housing 1 and projecting forwardly from the lower portion thereof is an integral bracket 6.

The reference numeral 7 designates the rear end portion of a conventional tractor and secured thereon and projecting rearwardly therefrom is a supporting arm 8. The bracket 6 is bolted to the rear end portion of the supporting arm 8, as at 9. Thus, the housing 1 is mounted on the tractor 7.

The reference numeral 10 designates a drive shaft which, as illustrated to advantage in Fig. 2 of the drawing, has its rear end journalled in the bearing 5 in the housing 1. The drive shaft 10 is connected in any suitable manner to the usual power take off on the rear end of the tractor 7, as at 11. Fixed on the rear end portion of the drive shaft 10 and operable in the housing 1 is a pinion gear 12.

The reference numeral 13 designates a vertical shaft which is rotatably and slidably mounted in the bearings 3 and 4 of the housing 1 and which extends above and below said housing. Fixed on the lower end portion of the shaft 13 is a suitable auger 14. The reference numeral 15 designates a bevelled gear which is mounted horizontally in the upper portion of the housing 1 and which is splined on the shaft 13 between the bearings 3 and 4. The gear 15 is driven by the gear 12. The gears 12 and 15 may be of any suitable ratio. It will thus be seen that the shaft 13, while being driven by the gear 15, is free for vertical sliding movement.

The reference numeral 16 designates a metallic supporting member or bar having one end portion pivotally connected to the tractor 7 and rising therefrom. Pivotally mounted, at an intermediate point, on the upper end portion of the supporting bar 16 is a hand lever 17. One end portion of the hand lever 17 is coupled to the upper end of the shaft 13 through the medium of a ball and socket connection 18.

It is thought that the operation of the device will be readily apparent from a consideration of the foregoing. The vertical shaft 13 is driven from the power take off of the tractor 7 for rotating the auger 14 through the shaft 10 and the gears 12 and 15. The hand lever 17 permits the auger 14 to be raised and lowered as desired for feeding said auger into the ground or for elevating said auger above the ground as, for example, when the tractor with the apparatus thereon is to be moved. The construction and arrangement is such that the digger may be expeditiously removed from the tractor when desired.

It is believed that the many advantages of a post hole digger constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A post hole digger comprising a housing having an opening therein, a pair of vertically aligned spaced bearings integral with said housing, the lowermost bearing extending upwardly into the housing, a third bearing extending horizontally from the upper portion of said lowermost bearing in the housing, a vertical shaft extending rotatably and slidably through the first named bearings, an auger fixed on the lower end portion of said vertical shaft, a drive shaft having one end portion journalled in the third named bearing, gears operatively connecting the vertical shaft to the drive shaft for actuation thereby, and means for manually raising and lowering the vertical shaft, said means including an upstanding supporting member having its lower end portion pivotally connected to a support, a hand lever pivotally mounted, at an intermediate point, on the upper portion of said supporting member, and a ball and socket connection coupling one end of said hand lever to the upper end of the vertical shaft.

AUGUST B. CROZIER.